United States Patent [19]

Calcaterra et al.

[11] 4,162,867
[45] Jul. 31, 1979

[54] DUAL CUTTER BORING HEAD

[75] Inventors: Donald J. Calcaterra; Robert A. Rhinefrank, both of Stockton; Donald W. Barton, Manteca, all of Calif.

[73] Assignee: Carando Machine Works, Stockton, Calif.

[21] Appl. No.: 896,681

[22] Filed: Apr. 17, 1978

[51] Int. Cl.² ............................................. B23B 51/00
[52] U.S. Cl. ................................. 408/157; 408/161; 408/173; 408/178; 408/179
[58] Field of Search ................ 408/173, 174, 178, 179, 408/157, 181, 183, 185, 161, 168, 197

[56] References Cited

U.S. PATENT DOCUMENTS

| 828,632 | 8/1906 | Sprink | 408/174 |
|---|---|---|---|
| 1,097,096 | 5/1914 | Heuerman et al. | 408/197 X |
| 1,324,459 | 12/1919 | Maier | 408/182 |
| 1,684,772 | 9/1928 | Manning | 408/157 |
| 1,977,058 | 10/1934 | Haram et al. | 408/161 X |
| 2,680,390 | 6/1954 | Chapman | 408/168 |
| 3,728,037 | 4/1973 | Benjamin et al. | 408/168 |
| 3,853,422 | 10/1974 | Benjamin et al. | 408/179 X |

FOREIGN PATENT DOCUMENTS

| 1075921 | 2/1960 | Fed. Rep. of Germany | 408/174 |
|---|---|---|---|
| 2012643 | 10/1971 | Fed. Rep. of Germany | 408/161 |
| 1149410 | 12/1957 | France | 408/157 |
| 354646 | 7/1961 | Switzerland | 408/173 |

Primary Examiner—William R. Briggs
Attorney, Agent, or Firm—Roger B. Webster

[57] ABSTRACT

In the machine tool art, a dual cutter boring head which comprises a cylindrical body having side-by-side, tool-holding slides mounted diametrally thereon; the slides at their outer ends being fitted with cutters disposed exteriorly of the periphery of the body, and micro-adjustment mechanism within the confines of the body arranged to impart simultaneous, opposed, reversible motion to the slides whereby to precisely and equally adjust the slides and the cutters thereon outwardly or inwardly, selectively.

8 Claims, 4 Drawing Figures

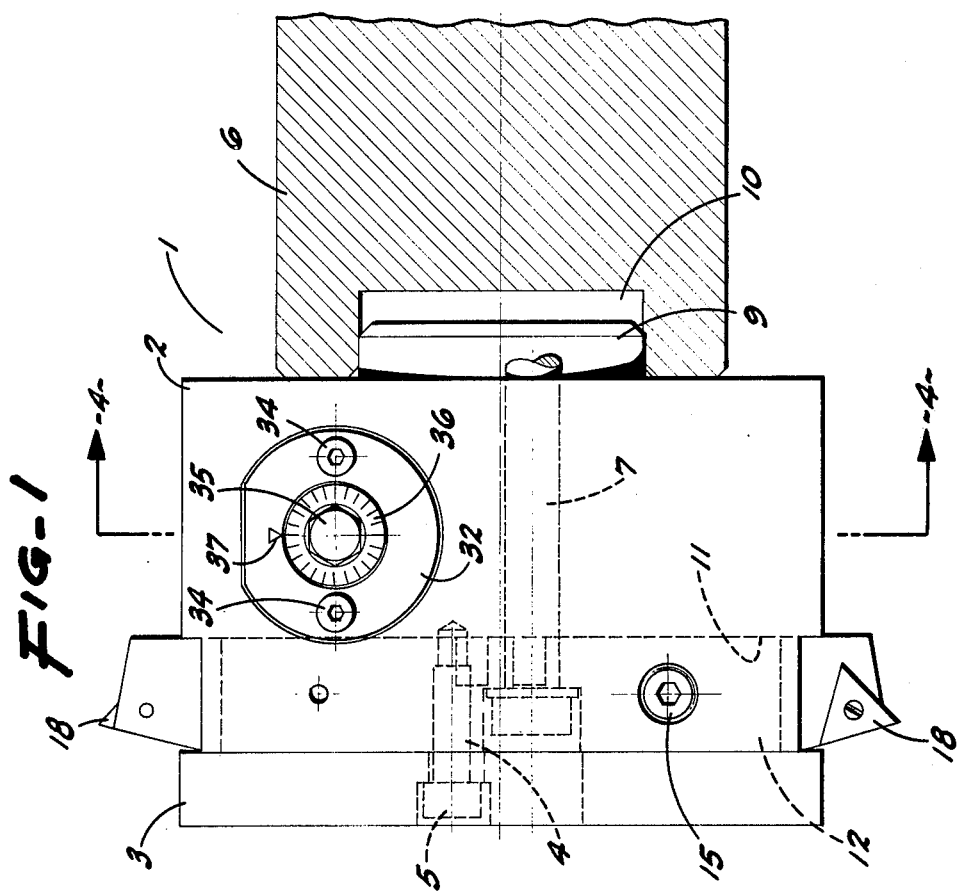
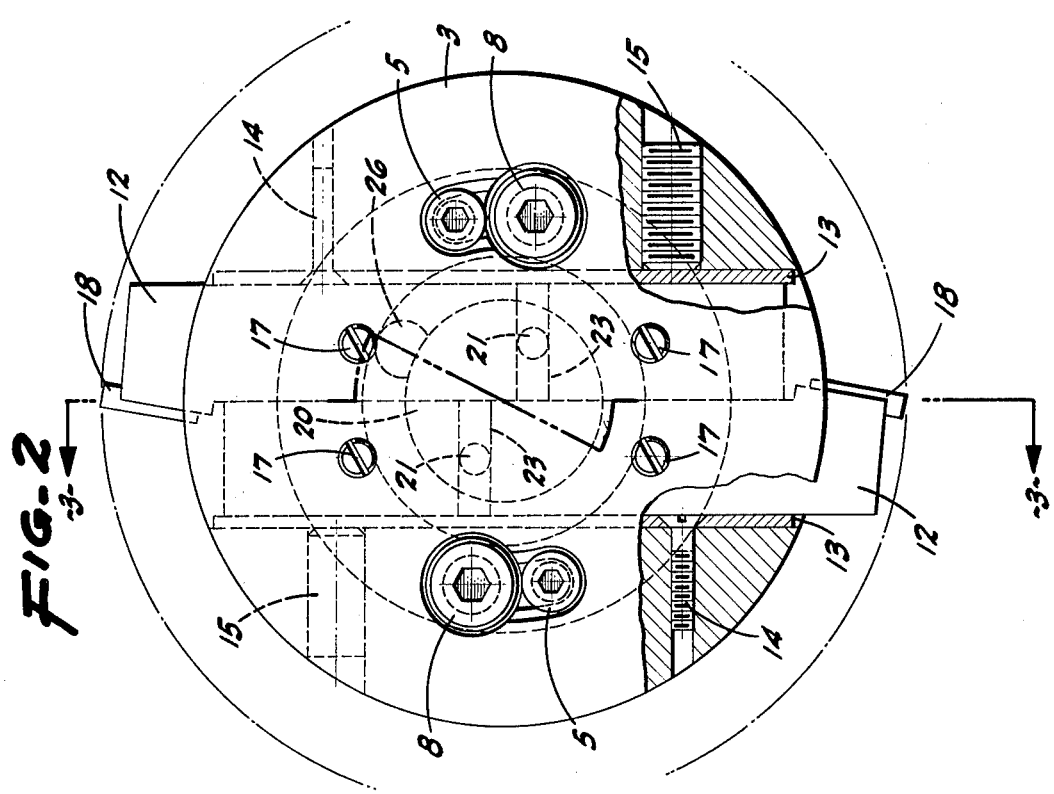

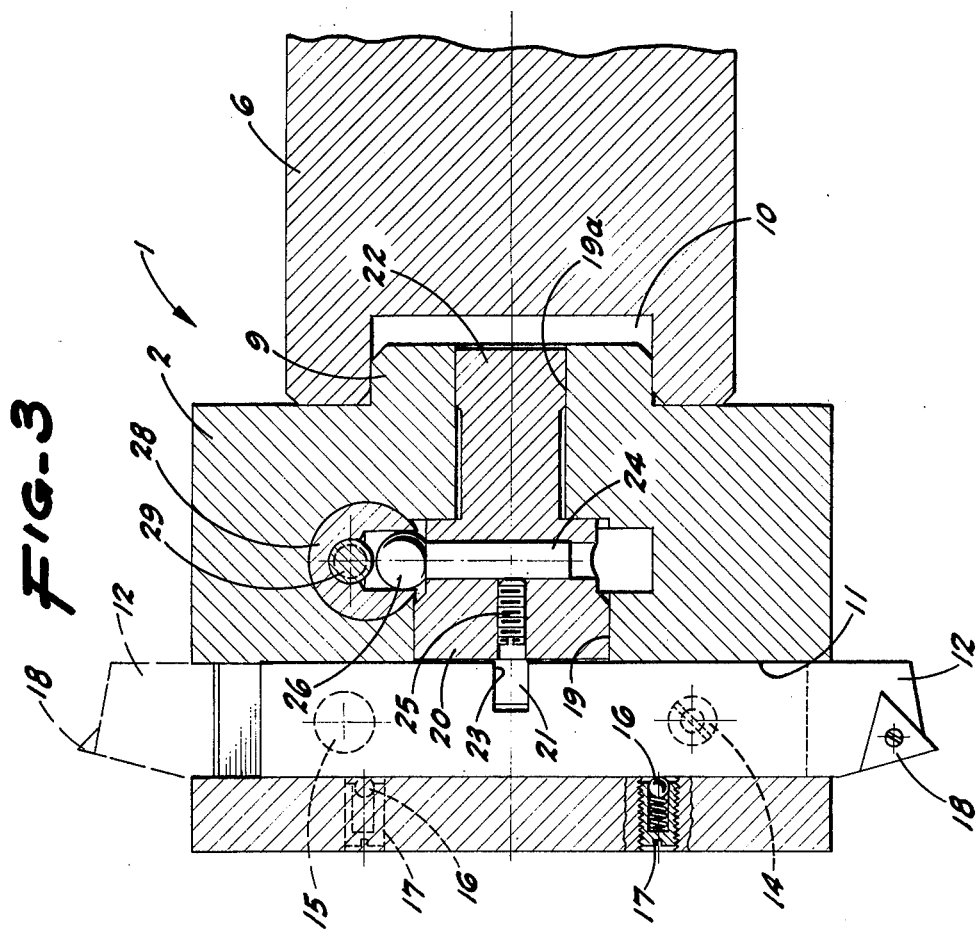
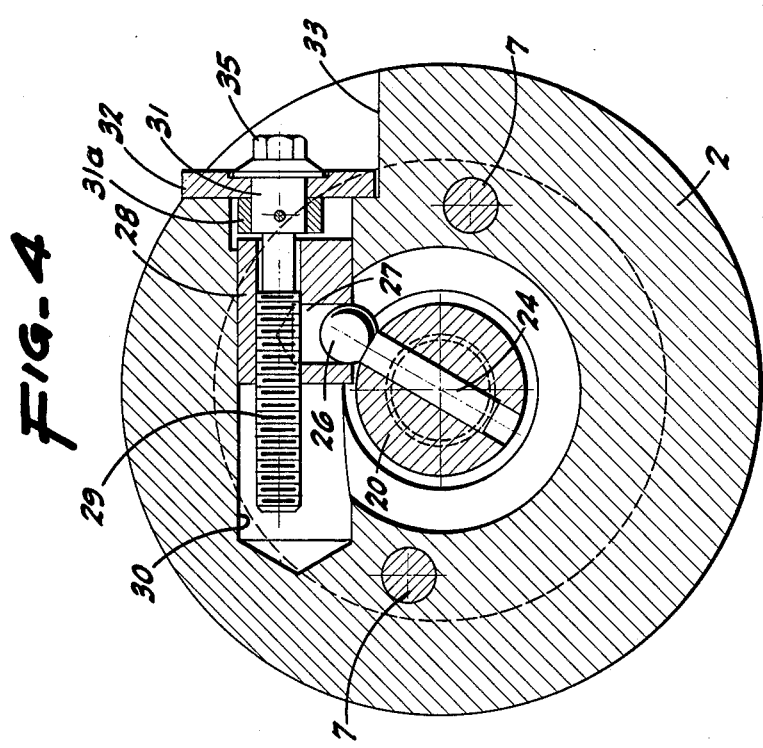

DUAL CUTTER BORING HEAD

BACKGROUND OF THE INVENTION

1. Field of the Invention

Dual cutter boring heads are known in the machine tool art, and wherein the cutters—disposed in diametrally opposed relation—are mounted on slides carried on a rotary body. However, the mechanisms provided to effect adjustment of the slides and cutters thereon has frequently been unsatisfactory in that extremely precise settings of the cutters could not be attained and as modern machining practices demand. Also, the manner of mounting the tool-holding slides did not always maintain them against undesirable loose play. The present invention was conceived in a successful effort to avoid such problems.

2. The Prior Art

U.S. Pat. Nos. 402,394; 767,036; 1,392,203; 1,813,668; 1,883,810; 2,223,041; 3,456,531; 3,702,611 and 3,902,386 represent the most relevant prior art known to applicants.

The above prior art—considered singly or together—does not anticipate, nor suggest as obvious, the particular structure and function of the herein-claimed dual cutter boring head, and applicants have no knowledge of any prior art disclosing such particular structure and its function.

SUMMARY OF THE INVENTION

The present invention provides, as a major object, a dual cutter boring head which comprises a cylindrical body having side-by-side, tool-holding slides mounted diametrically thereon; the slides at their outer ends being fitted with cutters disposed exteriorly of the periphery of the body, and micro-adjustment mechanism within the confines of the body arranged to impart simultaneous, opposed, reversible motion to the slides whereby to precisely and equally adjust the slides and the cutters thereon outwardly or inwardly, selectively.

The present invention provides, as a further object, a dual cutter boring head which is designed for ease and economy of manufacture.

The present invention provides, as a still further object, a practical, reliable, and durable dual cutter boring head, and one which is exceedingly effective for the purpose for which it is designed.

BRIEF DESCRIPTION OF THE DRAWINGS

FIG. 1 is a side elevation—partly broken away and in section—of the dual cutter boring head; the view being of the side from which the head of the adjusting screw is accessible.

FIG. 2 is a face elevation of the dual cutter boring head.

FIG. 3 is a sectional view taken substantially on line 3—3 of FIG. 2.

FIG. 4 is a sectional view taken substantially on line 4—4 of FIG. 1; the view showing one of the slide actuating pins, and the latter in a position rotated approximately 30 degrees counterclockwise from FIG. 2.

DESCRIPTION OF THE PREFERRED EMBODIMENT

Referring now more particularly to the drawings and to the characters of reference marked thereon, the dual cutter boring head, indicated generally at 1, is comprised of a cylindrical body 2 provided on the face with a removable, circular cover plate 3 held in place by bolts 4 having countersunk heads 5. The boring head 1 is mounted on the outer end of a boring bar 6 by bolts 7 having countersunk heads 8; the head 1 being centered on the boring bar 6 by a pilot neck 9 received in a recess 10.

Beneath the cover plate 3, and outwardly closed thereby, the body 2 is formed with a diametral channel 11 which is rectangular in cross section; the channel receiving therein a pair of side-by-side, tool-holding slides 12 also rectangular in cross section and substantially fitting in channel 11 between clamping strips 13 which line the sides of said channel, and fitting between the cover plate 3 and the bottom of such channel.

The strips 13 are fixed adjacent one end to the related side of channel 11 by screws 14, while—adjacent the other end—the strips 13 are engaged by plug-type screws 15 which—when tightened—urge the strips into clamping engagement with the corresponding slide 12.

The cover plate 3 is fitted with spring-pressed balls 16 carried in screw plugs 17 and exposed to the inner face of said cover plate; the balls 16 bearing on the slides 12 and urging them into close engagement with the bottom of channel 11.

Each of the slides 12 is provided at the outer end thereof, and exteriorly of the periphery of body 2, with a cutter 18; such cutters being removable for replacement, and of standard form.

In a selected position of adjustment of the cutters (with the adjustment accomplished as hereinafter appears, and before use of the boring head), the tool or cutter holding slides 12 are clamped against motion by tightening the screws 15 against the strips 13, and which binds the latter against the related slides. For proper and balanced clamping, each screw 15 opposes a screw 14.

The following micro-adjusting mechanism is employed to impart simultaneous, opposed, reversible motion to the slides whereby to precisely and equally adjust the slides and the cutters thereon outwardly or inwardly, selectively.

The body 2 is formed with a circular, axial bore 19 which opens into the channel 11 at the bottom, and centrally of the ends, thereof. A circular, flat-faced, rotary carrier 20 is disposed in the bore 19 with a close running fit; the face of the carrier 20 being flush with the bottom of channel 11.

A pair of spaced, diametrally opposed pins 21 are fixed on the carrier 20 and project from the face thereof into said channel 11 in parallelism to the axis of body 2. The carrier 20 includes an integral, reduced-diameter pilot shank 22 which turnably projects into an extension 19a of bore 19.

The slides 12—intermediate their ends—are each transversely straight-slotted on the underside, with such cross slots—indicated at 23—individually receiving a corresponding one of the pins 21 with a close but sliding fit. Upon part-circle rotation of the carrier 20, and as the pins 21 are equally spaced on opposite sides of the axis of said carrier 20, the slides 12 (and the cutters 18 thereon) are simultaneously moved outwardly or inwardly (depending on the direction of carrier rotation) to adjust said cutters to a desired working position and with each exactly the same distance from the axis of the boring head.

The pin carrier 20 is reversibly part-circle rotated, for the above purpose, by the following micro-adjustment arrangement accommodated by suitable aperturing within the body 2.

A spindle 24 extends diametrally in the carrier 20 and is secured therein by a set screw 25; such spindle 24—at one end and exteriorly of said carrier 20—being formed with an integral ball 26.

The ball 26 seats in a socket 27 formed in laterally offset relation on a cylindrical nut 28 threaded on an adjustment screw 29; the cylindrical nut 28 being slidably guided in a bore 30 extending tangentially of the bore 19.

At its outer end, the screw 29 includes a neck 31, having a stop collar 31a, associated with a retainer 32 secured in a recess 33 in body 2 by bolts 34; the outer and exposed end of said screw 29 being formed with a multi-sided head 35 (adapted for wrench reception) and an indexing dial 36 on which a pointer 37 reads.

For use, the above-described boring head is first adjusted to the desired cutting diameter; this being accomplished as follows:

At the outset, the clamping screws 15 are both untightened and which frees the slides 12 for sliding motion in the channel 11 between the clamping strips 13. Nextly, by a hand wrench engaged on the head 35, the screw 29 is rotated (in one direction or the other) causing the nut 28 to advance or retract on said screw 29. Such lineal travel of the nut 28 is translated—by the ball 26—into part-circle rotary motion of carrier 20. Upon the occurrence of such part-circle rotary motion of the carrier 20, the pins 21 simultaneously—but oppositely—shift the slides 12 in the channel 11 and to a selected position of the cutters 21. After the slides 12 are so adjusted, the clamping screws 15 are tightened, forcing the clamping strips 13 against the slides and binding them against slippage in channel 11. The boring head 1 is then used in a conventional manner.

The advantages of the described dual cutter boring head include its simplicity of structure and ready manufacture and assembly, while providing—through the medium of its microadjusting mechanism—very precise and accurate setting of the cutters through the entire range of adjustment. The boring head is rugged, easy to adjust, functions without vibration, and is subject to a minimum of wear and tear in use.

From the foregoing description, it will be readily seen that there has been produced such a dual cutter boring head as substantially fulfills the objects of the invention as set forth herein.

While this specification sets forth in detail the present and preferred construction of the dual cutter boring head, still in practice such deviations from such detail may be resorted to as do not form a departure from the spirit of the invention as defined by the appended claims.

We claim:

1. A dual cutter boring head comprising a body adapted for rotation about a predetermined axis, the body having a diametral channel therein, a pair of tool-holding slides disposed in side-by-side relation in the channel, the channel having a bottom, means retaining the slides in the channel in engagement with the bottom thereof, each slide having an outer end projecting from a corresponding side of the body, a cutter mounted on each slide at said outer end, a member journaled in the body for rotation about the axis thereof, such member having a face open to the bottom of the channel, a pair of pins on said member in spaced-apart, radially-opposed relation, the pins projecting from the face of said member into the channel, the slides having transverse slots therein, the pins engaging in corresponding slots whereby—upon part-circle rotation of such member—the pins move the slides in opposition in the channel to adjust the cutters, means on the body operable from exteriorly thereof arranged to cause such part-circle rotation of said member, and releasable means normally securing the slides against movement in the channel.

2. A boring head, as in claim 1, in which the channel is initially open opposite the bottom; there being a cover plate secured on the body in closing relation to the channel and overlying the slides therein.

3. A boring head, as in claim 1, including clamping strips engaged between the sides of the channel and the adjacent slides; there being means in the body normally, but releasably, urging the strips into clamping engagement with the related slides.

4. A boring head, as in claim 1, in which the means to cause part-circle rotation of said member includes a screw, and a motion-translating connection between the screw and said member; the screw being reversibly rotatable whereby, through such connection, to cause rotation of said member in one direction or the other, selectively, with attendant simultaneous movement of the slides in opposition and in directions to adjust the cutters outwardly or inwardly, respectively.

5. A boring head, as in claim 1, in which said member is a circular rotary carrier, and the means to cause part-circle rotation of such carrier includes —within the body—a spindle fixed on and projecting radially from the carrier, a ball on the outer end of the spindle, a socket in which the ball is engaged, the socket being formed laterally on a nut, an axially fixed screw reversibly rotatable in the body and operable from exteriorly thereof, the nut being threaded on the screw and movable along such screw upon reversible rotation thereof, movement of the nut on the screw being translated by the socket-engaged ball and the spindle into said part-circle rotation of the carrier in one direction or the other, selectively, with attendant simultaneous movement of the slides in opposition and in directions to adjust the cutters outwardly or inwardly, respectively.

6. A dual cutter boring head comprising a body adapted for rotation about a predetermined axis, the body having a diametral channel therein, a pair of tool-holding slides disposed in side-by-side relation in the channel, each slide having an outer end projecting from a corresponding side of the body, a cutter mounted on each slide at said outer end, a rotatable member journaled in the body, means in the body between said member and the slides operative—upon part-circle rotation of such member—to move the slides in opposition in the channel to adjust the cutters, means in the body in part accessible from exteriorly thereof arranged to cause such part-circle rotation of said member, and releasable means normally securing the slides against movement in the channel; the means to cause part-circle rotation of said member including a screw, and a motion-translating connection between the screw and said member; and said motion-translating connection comprising a nut threaded on and lineally movable along the screw upon rotation thereof, the nut having a laterally opening socket formed thereon, the screw being parallel to the axis of the member, a radial spindle on and projecting from the member, and a ball on the outer end of the spindle engaged in the socket.

7. A dual cutter boring head comprising a body adapted for rotation about a predetermined axis, the body having a diametral channel therein, a pair of tool-holding slides disposed in side-by-side relation in the channel, each slide having an outer end projecting from a corresponding side of the body, a cutter mounted on each slide at said outer end, a rotatable member journaled in the body, means in the body between said member and the slides operative—upon part-circle rotation of such member—to move the slides in opposition in the channel to adjust the cutters, means in the body in part accessible from exteriorly thereof arranged to cause such part-circle rotation of said member, and releasable means normally securing the slides against movement in the channel; the means to cause part-circle rotation of said member comprising a screw extending in adjacent but spaced relation to the member and parallel to its axis, a nut threaded on and lineally movable along the screw upon rotation thereof, the screw having an operating end accessible from exteriorly of the body, a socket formed on the nut and opening toward said member, a radial spindle fixed on said member and projecting toward the socket, and a ball on the outer end of the spindle engaged in the socket.

8. A dual cutter boring head comprising a body adapted for rotation about a predetermined axis, the body having a diametral channel therein, a pair of tool-holding slides disposed in side-by-side relation in the channel, each slide having an outer end projecting from a corresponding side of the body, a cutter mounted on each slide at said outer end, a rotatable member journaled in the body, means in the body between said member and the slides operative—upon part-circle rotation of such member—to move the slides in opposition in the channel to adjust the cutters, means in the body in part accessible from exteriorly thereof arranged to cause such part-circle rotation of said member, and releasable means normally securing the slides against movement in the channel; the channel having a bottom, and a face of said member being open to said bottom of the channel, the member being journaled for rotation about the axis of the body, and said slide moving means comprising a pair of pins on said member in spaced-apart, radially-opposed relation, the pins projecting from the face of said member into the channel, the slides having transverse slots therein, and the pins engaging in corresponding slots.

* * * * *